US006418536B1

United States Patent
Park (10) Patent No.: US 6,418,536 B1
(45) Date of Patent: Jul. 9, 2002

(54) POWER SAVING OF A PORTABLE COMPUTER USING HUMAN SENSING DEVICE

(75) Inventor: Woo-Il Park, Seoul (KR)

(73) Assignee: Samsung Electronics, Co., Ltd., Suwon (KR)

(*) Notice: Subject to any disclaimer, the term of this patent is extended or adjusted under 35 U.S.C. 154(b) by 0 days.

(21) Appl. No.: 09/287,341

(22) Filed: Apr. 7, 1999

(30) Foreign Application Priority Data

Apr. 7, 1998 (KR) .......................................... 98/12255

(51) Int. Cl.⁷ ................................................ G06F 1/32
(52) U.S. Cl. ...................................... 713/323; 713/324
(58) Field of Search ............................... 713/300–340; 345/211–215

(56) References Cited

U.S. PATENT DOCUMENTS

| 5,230,055 | A |   | 7/1993 | Katz et al. |
| 5,396,443 | A |   | 3/1995 | Mese et al. |
| 5,421,018 | A |   | 5/1995 | Hiyama |
| 5,548,764 | A |   | 8/1996 | Duley et al. |
| 5,715,464 | A |   | 2/1998 | Crump et al. |
| 5,822,598 | A |   | 10/1998 | Lam |
| 5,875,345 | A | * | 2/1999 | Naito et al. ............ 395/750.05 |
| 6,032,256 | A | * | 2/2000 | Bernard ....................... 713/200 |
| 6,134,667 | A | * | 10/2000 | Suzuki et al. ............... 713/300 |

FOREIGN PATENT DOCUMENTS

| DE | 19718911 A1 | * | 11/1998 | ............ G06F/1/32 |
| JP | 363059142 A | * | 3/1988 | ............ H04L/13/00 |
| JP | 401164990 A | * | 6/1989 | ............ G09F/9/00 |
| JP | 402120794 A | * | 5/1990 | ............ G09G/5/00 |
| JP | 404331982 A | * | 11/1992 | ............ G09G/5/00 |
| JP | 404344692 A | * | 12/1992 | ............ G09G/5/00 |
| JP | 405011713 A | * | 1/1993 | ............ G09F/9/00 |
| JP | 406337401 A | * | 12/1994 | ............ G02F/1/133 |
| JP | 407044144 A | * | 2/1995 | ............ G09G/5/00 |
| JP | 407234660 A | * | 9/1995 | ............ G09G/5/00 |
| JP | 408263033 A | * | 10/1996 | ............ G09G/5/00 |
| JP | 410011178 A | * | 1/1998 | ............ G06F/1/26 |
| JP | 410187116 A | * | 7/1998 | ............ G09G/5/00 |
| JP | 410268984 A | * | 10/1998 | ............ G06F/1/26 |

* cited by examiner

*Primary Examiner*—Sumati Lefkowitz
(74) *Attorney, Agent, or Firm*—Robert E. Bushnell, Esq.

(57) ABSTRACT

A portable computer is provided with a sensing device which responds to absence of the computer user so that the computer system instantly goes into a power saving function that cuts off power directed to a back-light unit of the LCD display panel. The sensing device includes a sensor for sensing a computer user within the predetermined sensing range, this sensor being mounted in the housing of the flat panel display with facing the computer user, to produce a signal representative of absence of the user within the range; and a controller in response to the output signal of said sensor to produce a control signal which allows the supply power directed to the flat panel display to be interrupted. The sensing signal consists of ultrasonic wave or infrared rays. The user sensing device of the portable computer continuously monitors the computer user. If the user has left the computer, the computer system immediately goes into the power saving function that turns off the back-light unit of the LCD display panel.

19 Claims, 6 Drawing Sheets

POWER SAVING OF A PORTABLE COMPUTER USING HUMAN SENSING DEVICE

CLAIM OF PRIORITY

This application makes reference to, incorporates the same herein, and claims all benefits accruing under 35 U.S.C. §119 from an application for Power Saving of a Portable Computer Using Human Sensing Device earlier filed in the Korean Industrial Property Office on Apr. 7, 1998 and there duly assigned Serial No. 12255/1998.

FIELD OF THE INVENTION

The present invention relates to portable computers, and more particularly to a portable computer having a power saving function that reduces supply power consumed in a display device.

BACKGROUND OF THE INVENTION

Compact and lightweight notebook and laptop computers have become increasingly popular due to their portability. These portable computers are typically powered by rechargeable batteries or alternatively by a power adapter which can be connected to an AC outlet. Often, it is desirable to operate the portable computers for lengthy periods of time in environments where AC power is unavailable.

As a system level solution, most portable computer systems usually adopt a power saving and power management system as provided in Advanced Power Management (APM) jointly developed by Intel (r) and Microsoft (r). This power management is to maximize available battery usage time. Basically, it automatically reduces the power consumption of parts of the computer currently not in use. The power management system provides various power saving function with the lapse of time set by the CMOS setup program, and manages the progress of power saving between full-on, doze, standby, and rest mode. The rest mode is the least power consumption level, which interrupts power supplies directed to microprocessor, display apparatus, hard disk drives, floppy disk drives, and other subsystems. Only supplied power is that with the subsystem which can restore the system to the full-on state.

Further, the power saving function may be performed by back-light timer with the lapse of time set by the CMOS setup program, which manages cut-off of power supply directed to a back-light unit of LCD display panel. When the system is not working for the preset time, the back-light unit of LCD display goes into power-off status. This power management is useful for portable computers having a LCD display panel to use less power while the system is running on battery power.

However, in actual computer using condition, when the portable computer is powered on and a computer work is proceeding, the work may be interrupted by some matter and the user may leave the portable computer without turning off power or having the computer system go into the rest mode of the power management. In this case, the battery power is still consuming while the user is leaving the portable computer. Further, if the system power down times of the above power management have been set with long time intervals, the power saving function may be ineffective in saving the battery power. This requires modification of the power down times in the power management setup to suit work conditions whenever required. Also, the adjustment process is inconvenient for the user and conversely the modified power saving function may be unsuitable for a specific computer work.

Thus, there is a need in the portable computer art a more effective and simple power saving function that can minimize unnecessary power consumption during the computer use regardless of the power management setup condition.

SUMMARY OF THE INVENTION

The present invention is intended to solve the prior art problems, and it is therefore an object of the invention to provide a portable computer which can perform an instant power saving function in response to absence of the computer user during use of the computer.

According to the present invention, the portable computer is provided with a sensing device which responds to absence of the computer user so that the computer system instantly goes into a power saving function that cuts off power directed to a back-light unit of the LCD display panel. A portable computer of the present invention comprises a sensor for sensing a computer user within the predetermined sensing range, said sensor being mounted in the housing of the flat panel display with facing the computer user, to produce a signal representative of absence of the user within the range; and a controller in response to said output signal of said sensor to produce a control signal which allows the supply power directed to the flat panel display to be interrupted.

The portable computer further comprises a basic input/output system (BIOS) which stores setup information regarding enabling/disabling the operation of said sensor. The sensor includes: a transmitter generating a sensing signal; and a receiver receiving the reflected sensing signal and responsive thereto outputting a signal representative of presence of the user.

Preferably, the sensing signal consists of ultrasonic wave or infrared rays. Further, the controller responds to the output signal representating presence of the user, and determines whether a user password flag has been set in the system BIOS and if the password has been set a command is sent to the BIOS, resulting in generation of a message requesting input of the user password.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
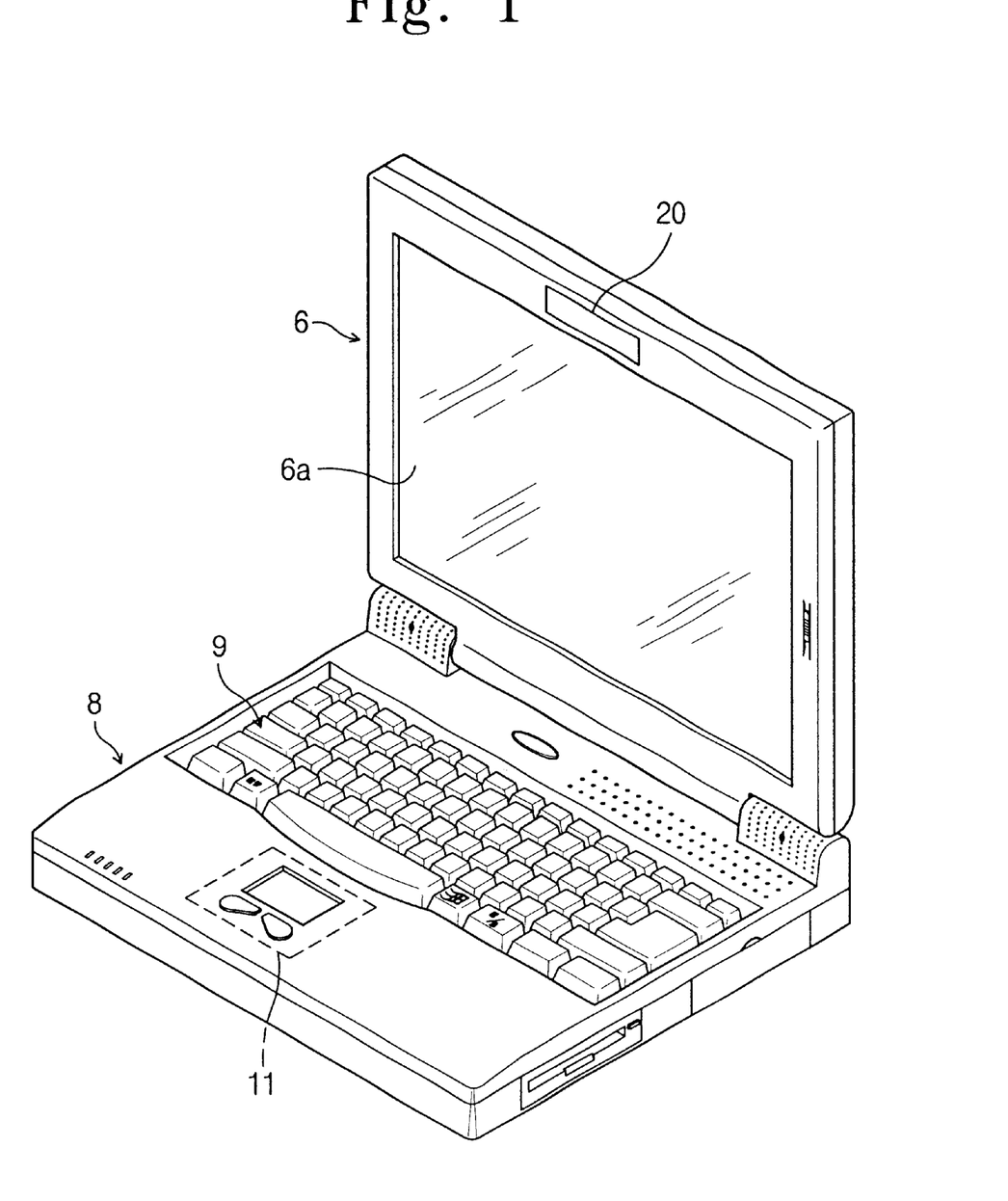
FIG. 1 is a perspective view of a preferred embodiment of a portable computer having a user sensing device in accordance with the present invention.

Referring to FIG. 1, there is shown a portable computer having a user sensing device in accordance with a preferred embodiment of the present invention. The portable computer is composed of a main body 8 having a keyboard 9 provided at top side thereof and a flat panel display 6 hingedly attached to the main body of portable computer. The flat panel display 6 includes an LCD (liquid crystal display) panel 6a facing a computer user in the open or use position and forms a lid covering the keyboard 9 of the main body in the close position. Provided in top portion of the flat panel display 6 is a user sensing device 20 to detect a person located within its predetermined sensing range. The user sensing device 20 has a sensor covered by a window that can transmit a sensing signal to the user and in return receive the sensing signal from the user. Responsive to the received sensing signal, the computer system instantly goes into a power saving function that cuts off power directed to a back-light unit of the LCD display panel 6, which will be described later with reference to FIG. 3. In the drawing, reference number 11 denotes a touch pad installed in top portion of the main body.

Figure 2:
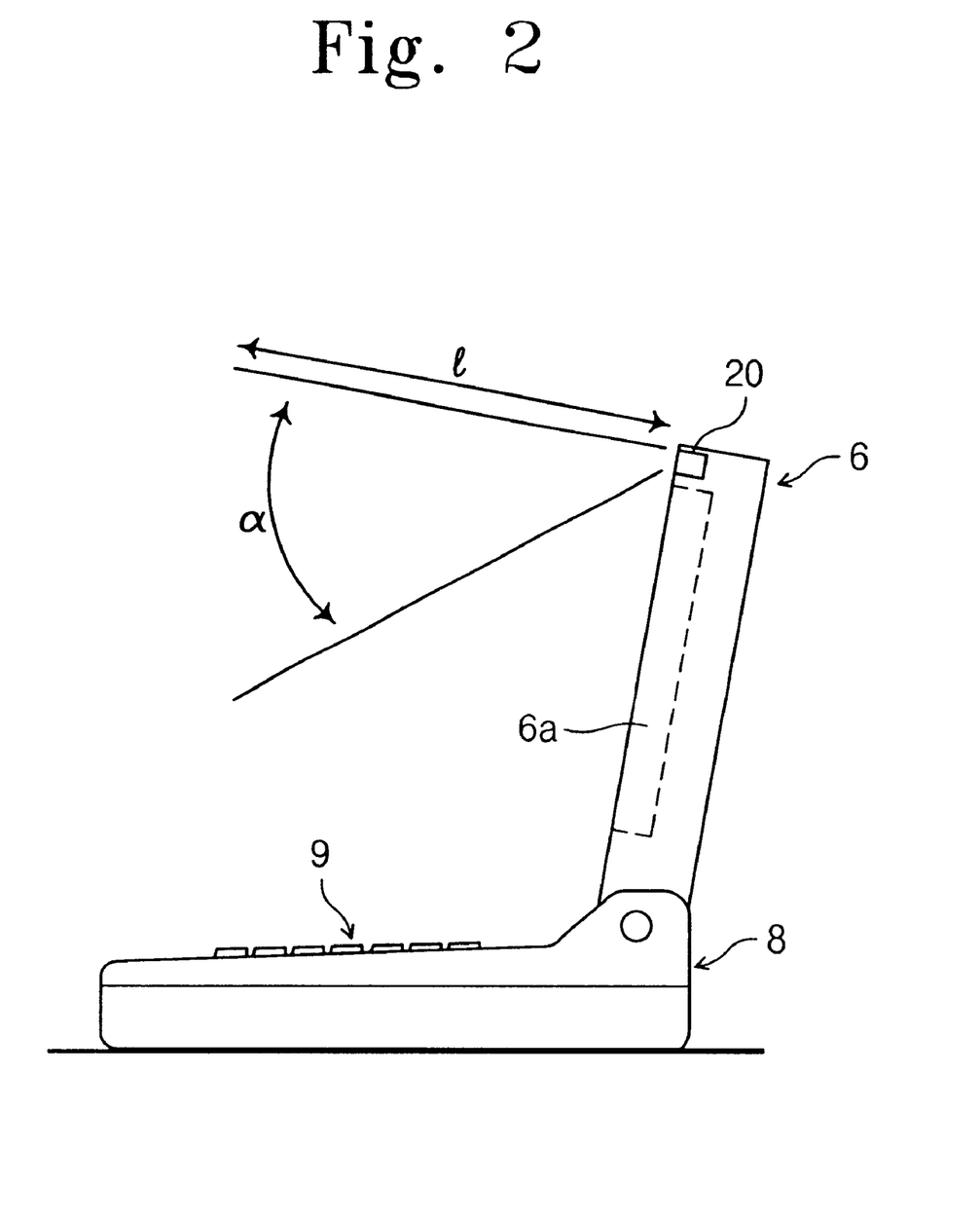
FIG. 2 is a side elevation of the portable computer of FIG. 1, for showing the sensing range determined by a sensor of the user sensing device.

As shown in FIG. 2, the sensing device 20 is preferably mounted in top portion of the housing of the flat panel display 6 so that it may face the computer user. The sensing range of the user sensing device 20 is determined by the propagation length l and angle α of the sensing beam that is generated in the sensing device to such an extent that it can be reached a user who is located in front of the portable computer for work.

Figure 3:
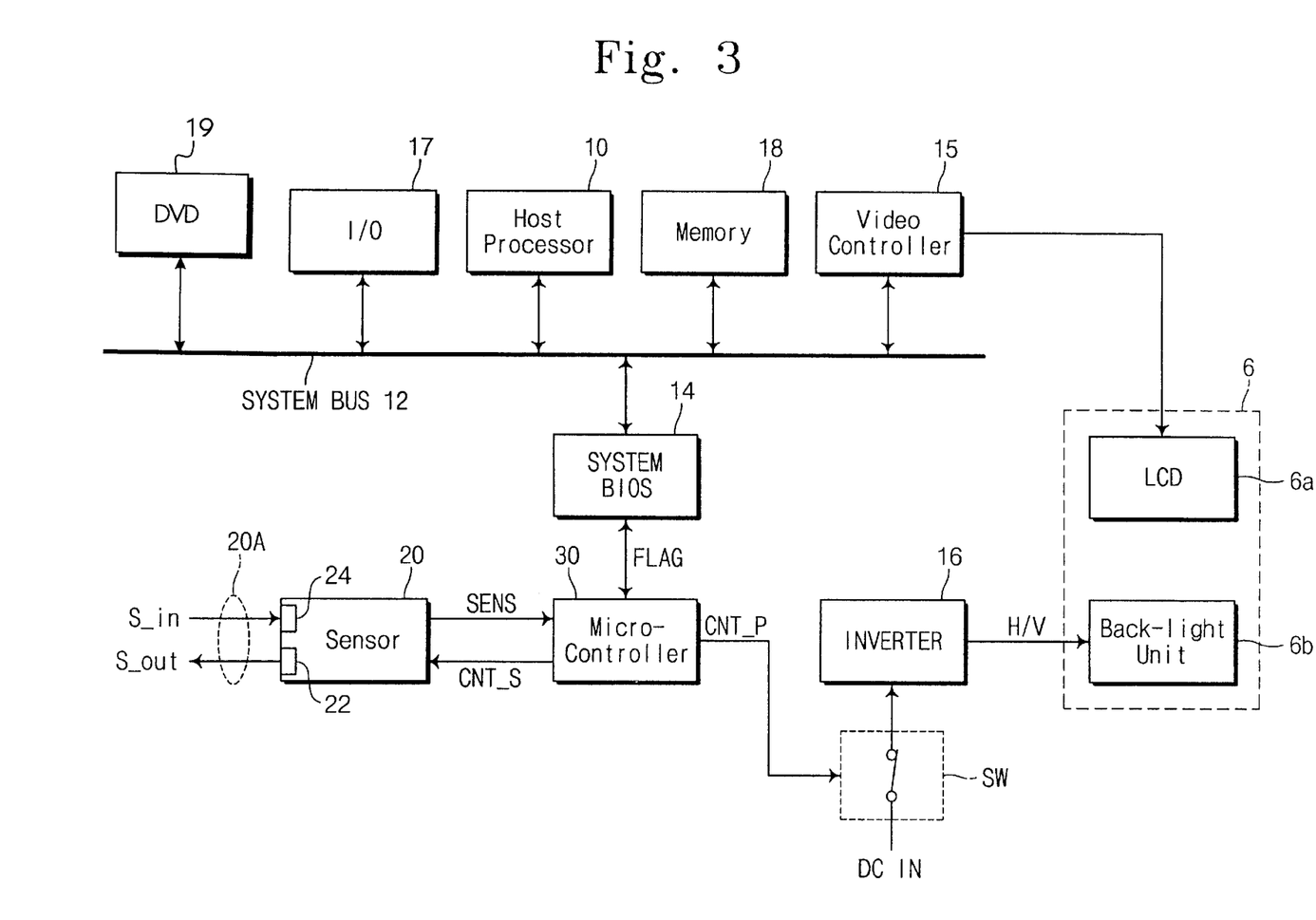
FIG. 3 is a block diagram of the portable computer system adopting the user sensing device of the present invention.

FIG. 3 shows a block diagram of the portable computer system adopting the user sensing device of the present invention. Basically, the portable computer system comprises a microprocessor 10, a basic input/output system (BIOS) 14, an input/output device 17, a memory 18, a video controller 15, and a DVD 19 connected one another through the system bus 12. The video controller 15 is coupled to an LCD display panel 6 which includes a liquid crystal display (LCD) device 6a and a back-light unit 6b of the display device 6a.

The computer system further comprises a microcontroller 30 coupled to the system BIOS 14. Input terminal of the microcontroller 30 is connected with the output terminal of the sensor device 20 and output terminal of the microcontroller 30 is connected with a control gate of a switch SW provided across DC power supply line directed to an inverter 16 which provides a high AC voltage (H/V) required in the back-light unit 6b of the LCD display panel 6. The sensor device 20 has a transmitter 22 and receiver 24 and a sensor drive circuit (not shown) for activating the transmitter 22 and receiver 24 by supplying an operating voltage. The transmitter 22 generates a sensing signal S_OUT and transmits it to the sensing range 20A. Received in the receiver 24 is the sensing signal S_IN reflected within the sensing range 20A. The sensing signal may be of ultrasonic wave or infrared rays.

The transmitter 22 and receiver 24 of the sensing device 20 are activated upon receiving a sensor control signal CNT_S fed from the microcontroller 30. The user sensing device 20 outputs a logic signal SENS to an input terminal of the microcontroller 30 representing whether the reflected sensing signal S_IN is received by the receiver 24 or not. Also, in response to the output signal SENS of the sensing device 20 the microcontroller 30 outputs a power control signal CNT_P to turn on/off the switch SW placed across the power supply line DC IN directed to the inverter 16. The switch SW may consist of a power transistor or a relay switch.

The BIOS 14 has a power management setup program stored in the BIOS memory. The power management setup program generally includes a list of items so that a user may enable/disable the power saving features and define the hard disk drive and system power down times. In accordance with the invention, the power management setup further includes an option of enabling/disabling a USER MONITORING function associated with operation of the user sensing device 20.

When the computer user sets the USER MONITORING function to be enabled, the microcontroller 30 reads out the setup information from the BIOS 14 preferably during the booting process and outputs the control signal CNT_S so as to activate the transmitter 22 and receiver 24 of the sensing device 20.

Figure 4:
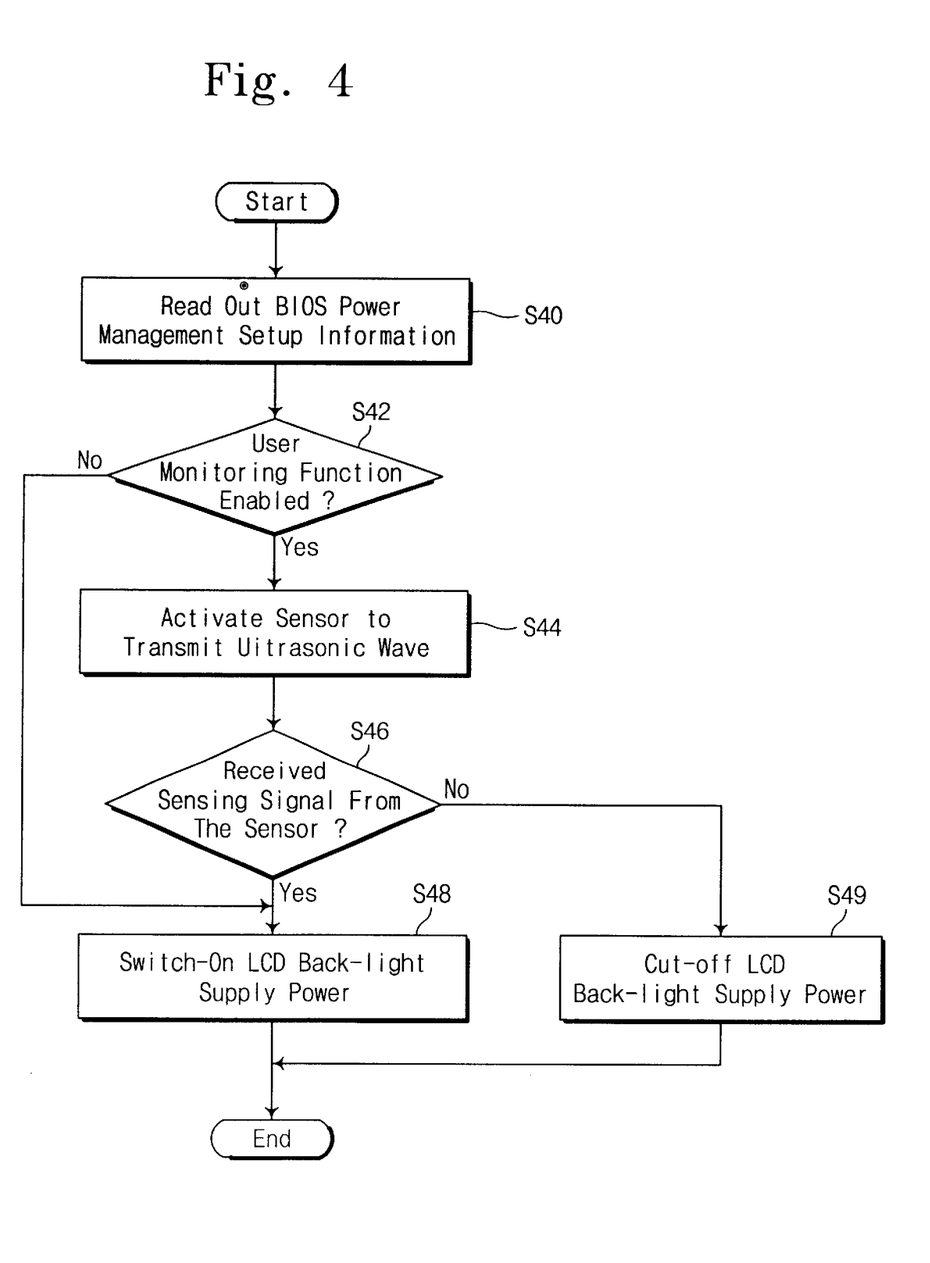
FIG. 4 is a flow diagram showing an operation mode of the user sensing device according to the invention.

A detailed operation of the microcontroller 30 with respect to the user monitoring function will be described with reference to the flow chart of FIG. 4. At step 40, during the system boot-up, the microcontroller 30 reads out the power management setup information from the BIOS 14. Then the microcontroller 30 determines whether the USER MONITORING function has been enabled, at step 42. If the USER MONITORING function has been enabled, the microcontroller 30 outputs a control signal CNT_S, at step 44, in order to activate the transmitter 22 and receiver 24 of the sensing device 20. Thus, a user sensing signal, for example ultrasonic wave is emitted to the sensing range by the transmitter 22 of the sensing device 20.

Next, the microcontroller 30 determines at step 46 whether the output signal SENS is inputted from the sensing device 20, representing that the reflected sensing signal S_IN is received by the receiver 24. If a user is located within the sensing range and the reflected ultrasonic wave is received by the receiver 24, the microcontroller 30 responds to the low level input signal SENS and produces a high level power control signal CNT_P that allows the switch SW to be in turn-on state and the DC power to be supplied with the inverter 16. Thus, at step 48, a high voltage AC power is generated in the inverter 16 and it is supplied with the back-light unit 6b of the LCD display panel 6. With this, the back-light unit 6b lit as is in the normal operation state.

On the other hand, if a user is out of the sensing range and the reflected ultrasonic wave is not received by the receiver 24, the microcontroller 30 responds to the high level input signal SENS and produces a low level power control signal CNT_P. This allows the switch SW to be turned off and the DC power to be cut-off with the inverter 16. Thus, at step 49, neither the required high voltage is generated in the inverter 16 nor AC power is supplied with the back-light unit 6b of the LCD display panel 6. With this, the back-light unit 6b is turned off and the computer system goes into the power saving function related to the back-light unit 6b. It should be noted that this power saving function can be started immediately on leaving of the user from the portable computer.

After this, if the user returns to the desk where the portable computer located and the reflected ultrasonic wave is received by the receiver 24, the microcontroller 30 directly responds to the input signal SENS and produces a high level power control signal CNT_P that allows the switch SW to return to ON state. Then the back-light unit 6b lights and the power saving function according to this invention stops.

In addition, if it is found that the USER MONITORING function has been disabled at step 42, the microcontroller 30 outputs a control signal CNT_S that inactivates the user sensing device 20 as well as the high level power control signal CNT_P that allows the switch SW to maintain switch-on state. Thus, the computer system performs normal power saving operation as designated in the power management setup program of the system BIOS.

Figure 5:
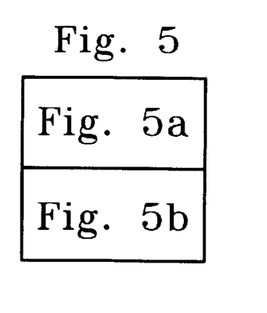
FIGS. 5a and 5b are flow diagrams depicting another operation mode of the user sensing device according to the invention.
Figure 5A:
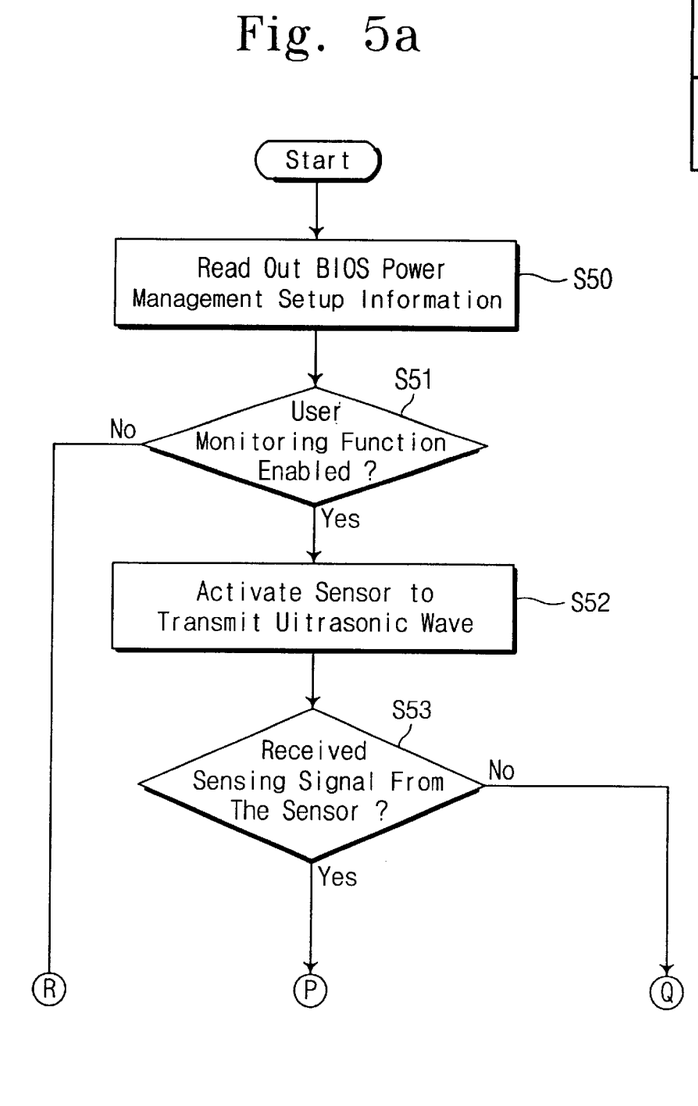
Figure 5B:
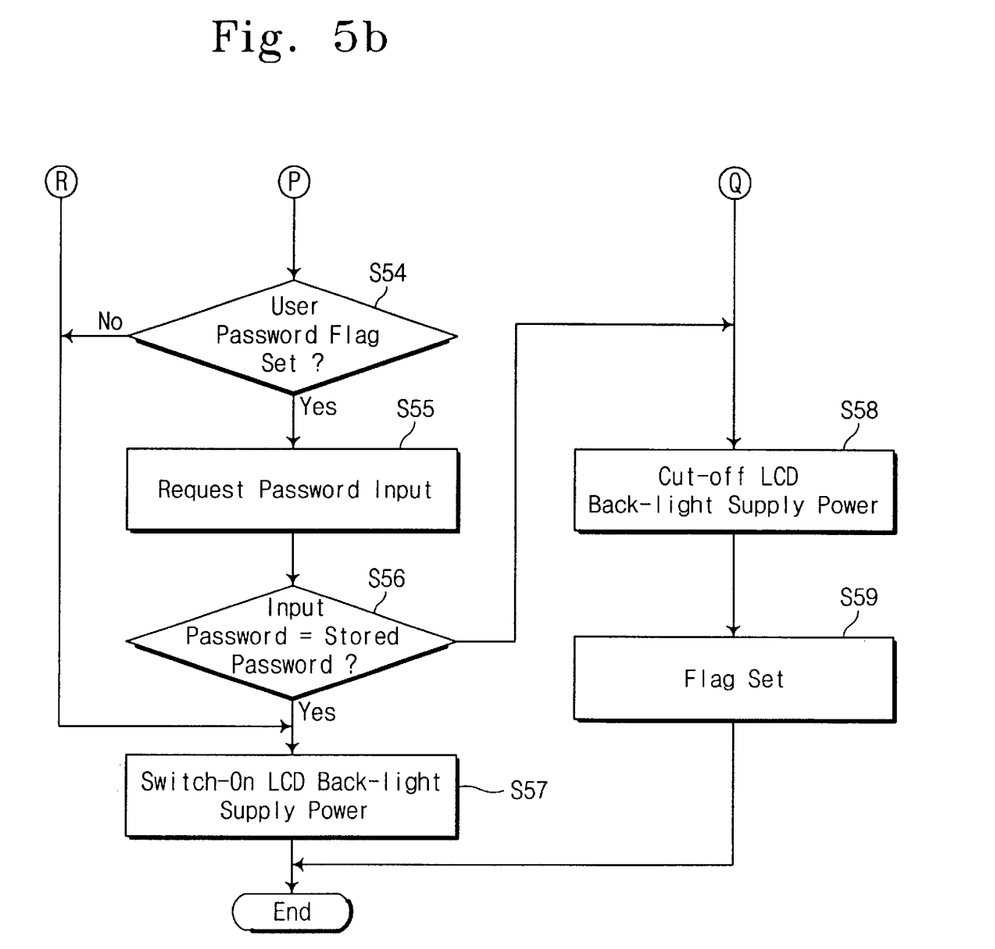

FIGS. 5a and 5b shows another operation mode of the microcontroller 30 with respect to the user sensing device 20 in accordance with the invention. At step 50, during the system boot-up, the microcontroller 30 reads out the power management setup information from the BIOS 14. Then the microcontroller 30 determines whether the USER MONITORING function has been enabled, at step 51. If the USER MONITORING function has been enabled, the microcontroller 30 outputs a control signal CNT_S, at step 52, to activate the transmitter 22 and receiver 24 of the sensing device 20. Thus, a user sensing signal, for example ultrasonic wave is emitted to the sensing range determined by the transmitter 22 of the sensing device 20.

Next, the microcontroller 30 determines at step 53 whether the output signal SENS is inputted from the sensing device 20, representing that the reflected sensing signal S_IN is received by the receiver 24. If a user is located within the sensing range and the reflected ultrasonic wave is received by the receiver 24, the microcontroller 30 responds to the low level input signal SENS and further determines at step 54 whether a user password flag has been set in the system BIOS 14. If a user password has been set, the microcontroller 30 send a command to the BIOS 14 which allows generation of a message requesting input of the user password, at step 55.

When the password has inputted, a further determination is made at step 56 whether the input password is identical with the stored password. In this step, if the input password is identical with the stored password, the microcontroller 30 produces a high level power control signal CNT_P that allows the switch SW to be in turn-on state and the DC power to be supplied with the inverter 16. Thus, at step 57, a high voltage AC power is generated in the inverter 16 and it is supplied with the back-light unit 6b of the LCD display panel 6. With this, the back-light unit 6b lit as is in the normal operation state.

On the other hand, if a user is out of the sensing range and the reflected ultrasonic wave is not received by the receiver 24, the microcontroller 30 responds to the high level input signal SENS and produces a low level power control signal CNT_P. This allows the switch SW to be turned off and the DC power applied with the inverter 16 to be cut off Thus, it proceeds to step 58, neither the required high voltage is generated in the inverter 16 nor AC power is supplied with the back-light unit 6b of the LCD display panel 6. With this, the back-light unit 6b is turned off and the computer system goes into the power saving function related to the back-light unit 6b. This power saving function is started immediately on leaving of the user from the portable computer. A flag is set in the BIOS at step 59 to represent initiation of the power saving related to the back-light unit 6b.

After this, if the user returns to the desk where the portable computer located and the reflected ultrasonic wave is received by the receiver 24, the microcontroller 30 queried at step 53 whether the output signal SENS is inputted from the sensing device 20, and responsive to the input signal SENS it produces a high level power control signal CNT_P that allows the switch SW to be returned on. Then the back-light unit 6b lights and the power saving function is interrupted.

In addition, if it is found that the USER MONITORING function has been disabled at step 51, the microcontroller 30 outputs a control signal CNT_S that inactivates the user sensing device 20 as well as the high level power control signal CNT_P that allows the switch SW to maintain switch-on state as is in step 57. Thus, the computer system performs normal power saving operation as designated by the power management setup program of the system BIOS. Further, if it is found at step 54 that the user password flag has not been set in the BIOS, it proceeds to step 57 to allow the switch SW to be turn-on state directly.

As apparent from foregoing description, the user sensing device 20 of the portable computer continuously monitors the computer user. If it is found the user has left the computer, the computer system immediately goes into the power saving function that turns off the back-light unit of the LCD display panel. With this, a user-friendly feature of the power saving function can be provided in the power management system and more effective power saving operation can be performed in battery powered portable computers. Further, by using the user password input process, the computer system can recognize its registered user during an absence from the computer work, which results in protection of the contents of the work.

What is claimed is:

1. A portable computer having a panel display, comprising:
   a sensor for sensing a computer user within a predetermined sensing range, said sensor being mounted in the housing of the panel display facing the computer user when said panel display is opened, to produce a first signal representative of absence of the user within the sensing range; and
   a controller in response to said first signal of said sensor to produce a control signal which allows the supply power directed to the panel display to be interrupted, wherein said controller determines whether a user monitoring function option associated with operation of said sensor is enabled, and inactivates said sensor when the user monitoring function option is not enabled.

2. The portable computer of claim 1, wherein the user monitoring function option is included in a basic input/output system (BIOS) which stores setup information.

3. The portable computer of claim 1, wherein the sensor includes:
   a transmitter generating a sensing signal; and
   a receiver receiving a reflected sensing signal and responsive thereto outputting a second signal representative of presence of a user and said first signal representative of an absence of a user.

4. The portable computer of claim 2, wherein said controller produces a system management interrupt signal that allows the computer system to enter a power saving mode designated by the BIOS.

5. The portable computer of claim 3, wherein the sensing signal consists of ultrasonic wave.

6. The portable computer of claim 3, wherein the sensing signal consists of infrared rays.

7. The portable computer of claim 2, wherein the controller responds to the second signal representing presence of the user, and determines whether a user password flag has been set in the system BIOS and if the password has been set a command is sent to the system BIOS, resulting in generation of a message requesting input of the user password.

8. The portable computer of claim 1, wherein upon detecting the presence of the user while the power supply to the panel display interrupted, said controller determines whether a user password flag has been set, and if set, said controller asks the user to input a password, and determines whether the password inputted is identical with a password stored in the system BIOS, and resumes delivering power to the panel display panel if the inputted password is identical to the password stored in the system BIOS.

9. A portable computer, comprising:

a housing encasing a microprocessor, a system bus, and a keyboard enabling manual communication with said microprocessor;

a visual display illustrating varying images under control of said microprocessor;

a bezel rotatably attached to said housing while supporting said visual display in a plurality of raised orientations relative to said housing;

a sensor installed in said bezel detecting presence of a user in the vicinity of said portable computer when said bezel is rotated to one of said plurality of raised orientations; and a microcontroller connected to said system bus through a system BIOS, controlling the power management to a plurality of components within said portable computer, said microcontroller controlling whether power should be supplied to each of said plurality of components in dependence upon whether said sensor detects the presence of a user in the vicinity of said portable computer, wherein upon detecting the presence of the user while power is interrupted to the plurality of components, said microcontroller determines whether a user password flag has been set in the system BIOS, and asks the user to input a password when the user password flag has been set in the system BIOS, and determines whether the password inputted is identical with a password stored in the system BIOS, and resumes supplying power to said plurality of components if said inputted password is identical to said password stored in the system BIOS.

10. The portable computer of claim 9, wherein said sensor transmits and detects reflected ultrasound waves reflected off said user.

11. The portable computer of claim 9, wherein said sensor detects infrared radiation emanating from a user in the vicinity of said portable computer.

12. The portable computer of claim 9, wherein one of said plurality of components includes an LCD display panel. having a back-light unit.

13. The portable computer of claim 9, wherein one of said plurality of components includes a DVD player.

14. The portable computer of claim 9, wherein said bezel contains a bottom portion attached to said housing and a top portion distal from said housing, said sensor located in said top distal portion of said bezel.

15. The portable computer of claim 9, wherein if the password flag has been set, a command is sent to the BIOS, resulting in generation of a message requesting user input of a password before power can be restored to said plurality of components.

16. A process for interrupting a power supply to a portable computer to conserve power, comprising the steps of:

applying power to said portable computer;

opening the lid of said portable computer;

orienting the lid of said portable computer so that a sensor embedded in said portable computer can detect the presence or absence of a user in the vicinity of said portable computer;

determining whether a user monitoring function option associated with operation of said sensor is enabled;

inactivating said sensor when the user monitoring function option is not enabled; and interrupting power to said portable computer when the user monitoring function option is enabled and no user is in the vicinity of said portable computer.

17. The process of interrupting a power supply to a portable computer of claim 16, further comprising the step of transmitting ultrasound waves from said sensor and detected reflected ultrasound waves reflected off a user in the vicinity of said portable computer.

18. The process of interrupting a power supply to a portable computer of claim 16, further comprising.the step of detecting, by said sensor, the presence of infrared radiation in the vicinity of said portable computer in order to determine whether a user is in the vicinity of said portable computer.

19. The process of interrupting a power supply to a portable computer of claim 16, further comprising the steps of:

determining whether a user password flag has been set in the portable computer when said sensor resumes detecting a presence of a user in the vicinity of said portable computer; requesting the input of the user password if the password flag has been set; and resuming power to said portable computer if the correct password was inputted.

* * * * *